United States Patent [19]

Willard

[11] 4,052,007
[45] Oct. 4, 1977

[54] FLAP-TYPE TWO-DIMENSIONAL NOZZLE

[75] Inventor: Charles M. Willard, Crevecoeur, Mo.

[73] Assignee: United Technologies Corporation, Hartford, Conn.

[21] Appl. No.: 635,187

[22] Filed: Nov. 25, 1975

[51] Int. Cl.² .................................................. B64C 15/04
[52] U.S. Cl. .......................... 239/265.29; 239/265.37; 239/265.41
[58] Field of Search ....... 181/33 HB, 33 HC, 33 HD; 239/265.13, 265.17, 265.25, 265.27, 265.29, 265.37, 265.39, 265.41

[56] References Cited

U.S. PATENT DOCUMENTS

| 2,799,989 | 7/1957 | Kappus | 239/265.37 X |
|---|---|---|---|
| 2,858,668 | 11/1958 | Kelley et al. | 239/265.37 |
| 2,880,575 | 4/1959 | Scialla | 239/265.37 |
| 2,928,238 | 3/1960 | Hawkins | 181/33 HD |
| 3,057,150 | 10/1962 | Horgan | 239/265.29 X |
| 3,188,803 | 6/1965 | Maguire | 239/265.39 |
| 3,302,889 | 2/1967 | Di Sabato | 239/265.39 X |
| 3,367,579 | 2/1968 | Mehr | 239/265.41 |
| 3,454,227 | 7/1969 | Motycka | 239/265.39 |
| 3,612,209 | 10/1971 | Vdoviak et al. | 181/33 HD |
| 3,747,855 | 7/1973 | Vdoviak et al. | 239/265.29 |
| 3,806,035 | 4/1974 | Calder | 239/265.17 |
| 3,807,637 | 4/1974 | Camboulives et al. | 181/33 HD X |

Primary Examiner—John J. Love
Attorney, Agent, or Firm—Jack N. McCarthy

[57] ABSTRACT

A flap-type, two-dimensional nozzle for use with thrust creating vehicles which operate at both subsonic and supersonic speeds includes a rectangular exhaust with a cooperating primary flap and rotatable flap at the top and bottom thereof, the top and bottom flap systems have the primary flaps controlled collectively while the rotatable flaps rearwardly thereof can be controlled collectively or individually to achieve their desired objective. The primary flaps of the flap systems move between a position of minimum throat area and maximum throat area while the rotatable flaps move between a plurality of symmetrical positions which provide for forward thrust and reverse thrust and a plurality of differential positions which provide for thrust vectoring and modulated thrust.

5 Claims, 6 Drawing Figures

FLAP-TYPE TWO-DIMENSIONAL NOZZLE

BACKGROUND OF THE INVENTION

In the prior art, exhaust nozzle constructions having thrust reversing capability generally use pivoted flaps or clamshells to block axial flow within a duct and have doors in the nacelle or engine case to direct exhaust gases forwardly to provide reverse thrust.

This invention relates to variable area exhaust nozzles and more particularly to such exhaust nozzles which also have thrust vectoring, thrust reversing, and thrust modulation capabilities. A two-dimensional nozzle having primary flaps with pivotable flaps downstream thereof is shown in U.S. Pat. Nos. 3,057,150 and 3,302,889.

SUMMARY OF THE INVENTION

A primary object of this invention is to provide an improved two-dimensional exhaust nozzle which operates as a convergent-divergent nozzle at maximum throat area and as an ejector nozzle at minimum and intermediate throat areas, said nozzle having a convergent section consisting of a pair of collectively actuated area control primary flaps and a downstream section consisting of a pair of independently, or collectively, actuated rotatable flaps.

It is a further object of this invention to provide area control primary flaps which can be supported at the center of pressure of said flaps, to minimize actuation forces, and by pivoting the downstream rotating flaps about their center of pressure.

It is another object of this invention to provide a flap system which can be positioned to have thrust vectoring at minimum, intermediate and maximum throat area positions of the area control primary flaps. It is a further object of this invention to provide a flap system wherein the downstream rotatable flaps which form the divergent flaps can be rotated to a closed position to block axial flow and provide reversed thrust.

It is another object of this invention to provide for rotation of the rotatable flaps towards a reversed thrust position whereby thrust can be modulated.

It is a further object of this invention to provide a single pair of rotatable flaps having four functions: nozzle area ratio variation, thrust vectoring, thrust reversing, and thrust modulation.

DESCRIPTION OF THE PREFERRED EMBODIMENTS

Figure 1:
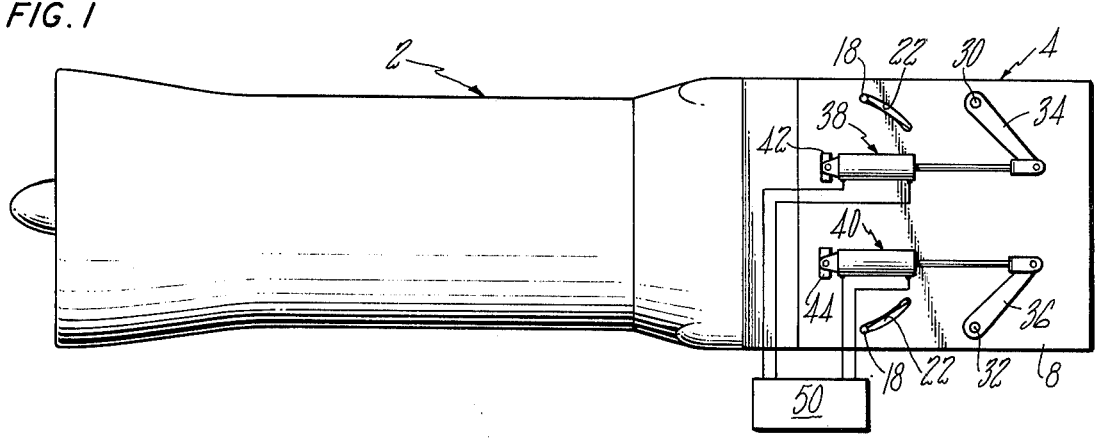
FIG. 1 is a view illustrating the location of a two-dimensional nozzle on a turbojet engine.

Referring to FIG. 1 the turbojet engine 2 shown includes a conventional compressor section, burner section and turbine section with an exhaust duct and two-dimensional nozzle 4. The engine 2 can include an afterburner or be another type of gas producer. The two-dimensional nozzle 4 has a rectangular cross section and can be connected to the circular exhaust duct of an engine by a transition section. The transition section takes the flow from a circular cross section to a rectangular cross section while maintaining the flow area substantially the same.

The two-dimensional nozzle 4 comprises two side plates, or walls, 8 extending rearwardly from the rear of the engine 2. A flap system is positioned at the top and the bottom of the two-dimensional nozzle 4 with each system having cooperating primary and rotatable flaps 10 and 12, and 14 and 16, respectively. Each primary flap 10 and 14 is mounted for translating movement between the side plates 8.

The inner side of each flap 10 and 14 forms a convergent flap surface. The forward edge of these primary flaps 10 and 14 are connected adjacent each corner to upper and lower actuators 20 and 21, respectively. The outer side of each primary flap 10 and 14 is formed of two surfaces B and C which are located at an angle to the surface A, giving the primary flap a triangular formation in cross section. Surfaces B and C are of approximately the same length.

Figure 2:
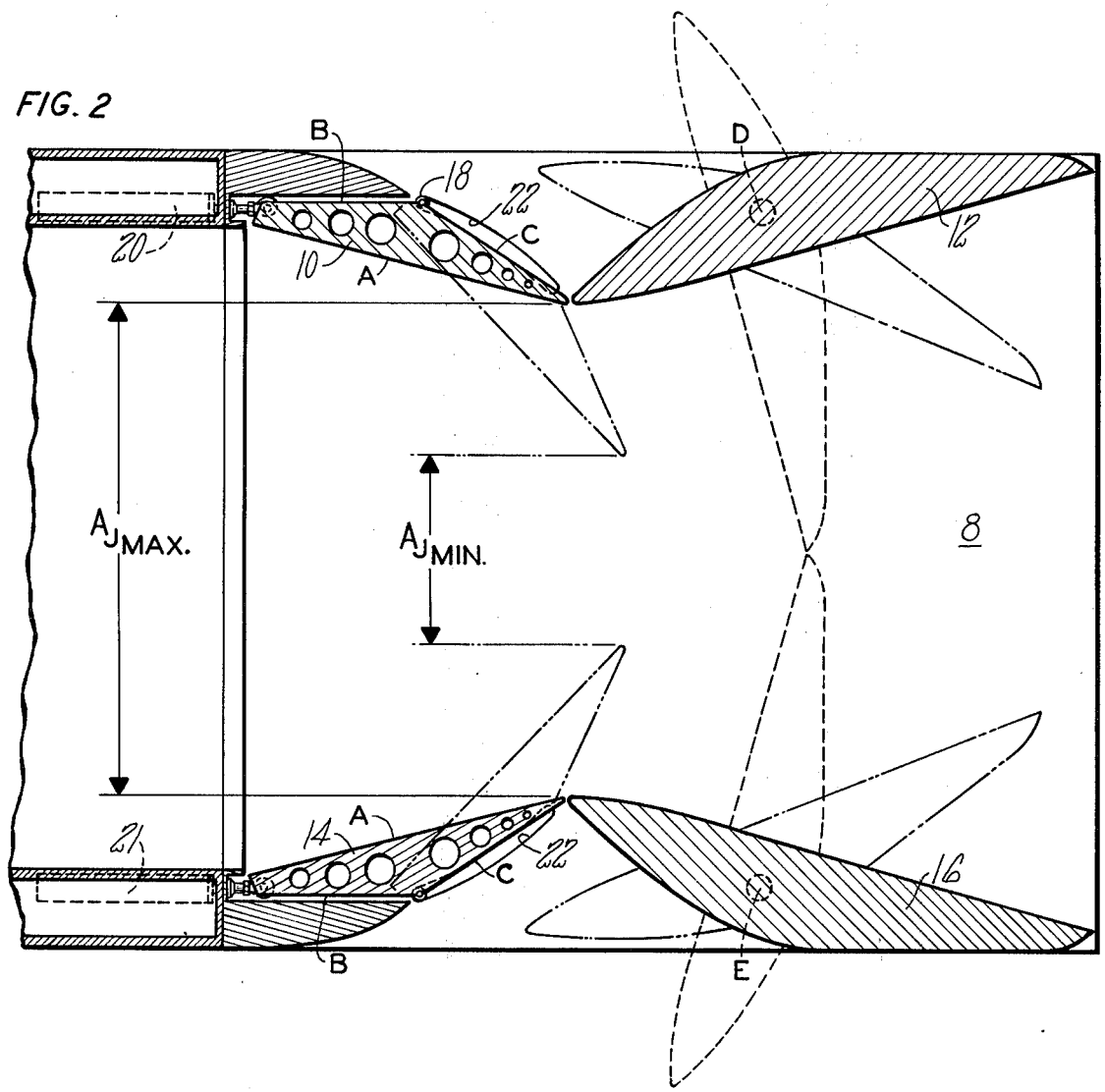
FIG. 2 is an enlarged schematic view showing three symmetric positions of the flaps.

While actuators 20 and 21 move the flaps 10 and 14 between their positions shown by solid line in FIG. 2 and shown by phantom line in FIG. 2, the flaps are guided by rollers 18 on each side thereof which ride in a track, or cam slot, 22, located in the side walls 8.

While slots have been shown in the side plates 8 for a guide, other track means can be attached to the side plates to guide the rollers 18.

The rollers 18 are positioned at the intersection of the surfaces B and C of a primary flap so as to support the primary flaps substantially at the center of pressure. The forward edge of the flaps are moved axially by the actuators and to insure this axial movement, rollers could also be placed at this point to ride in a second axial track, or cam slot, (not shown) located in the side walls. The actuators 20 and 21 are operated collectively by a control to position the primary flaps at three main positions (1) at $A_{J_{max}}$ for flight with afterburning, (2) at $A_{J_{min}}$ for flight without afterburning, and (3) at an intermediate $A_J$ for take-off with afterburning.

Each rotatable flap 12 and 16 is mounted for rotation about axes D and E, respectively. To minimize actuation forces, the rotating flaps are pivoted about their center of pressure. Short shaft sections 30 extend from each side of rotatable flap 12 and short shaft sections 32 extend from each side of rotatable flap 16. The short shaft sections are aligned so that the axes D and E extend through the centerline of the sections. The short shaft sections 30 and 32 extend through the side walls 8 and have lever arms 34 and 36 connected thereto for actuating said rotating flaps. Cylinder and piston units 38 and 40 are connected between the free ends of levers 34 and 36, and brackets 42 and 44, respectively. Brackets 42 and 44 are fixed to the side plates 8. Cylinder and piston units 38 and 40 can be operated individually or collectively by a control 50 to position the rotating flaps 12 and 16 at three main symmetrical positions and other differential positions.

The three main symmetrical positions of the rotatable flaps are shown in FIG. 2, they are (1) the solid line position showing the rotatable flaps serving as divergent flaps for the primary flaps 10 and 14 when they are in their $A_{J_{max}}$ position, (2) the phantom line position showing the rotatable flaps serving to form ejector flowpaths behind the primary flaps 10 and 14 when they are in their $A_{J_{min}}$ position, and (3) the dotted line position showing the rotatable flaps serving as blocking flaps for producing a reverse thrust.

While symmetrical positioning of the rotatable flaps 12 and 16 has been discussed, it is noted that the rotatable flaps 12 and 16 can be differentially positioned to provide thrust vectoring at minimum, intermediate, and maximum throat area positions of the primary flaps 10 and 14. Further, the rotatable flaps can be differentially positioned to provide a modulated thrust which comprises a positioning of the flaps so that an axial rearward thrust is obtained along with thrust reversal. Diagrammatic showings of some of these positions are set forth in FIGS. 3, 4, 5 and 6.

Figure 3:
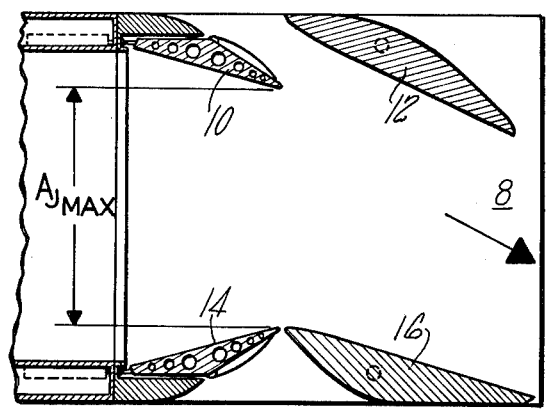
FIG. 3 is a small diagrammatic view showing one position of thrust vectoring during afterburning.
Figure 4:
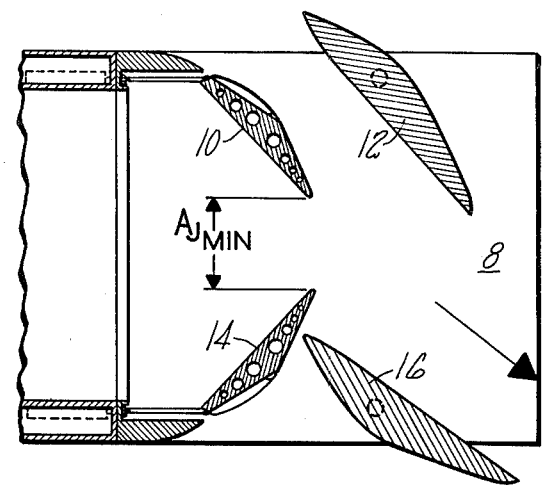
FIG. 4 is a small diagrammatic view showing one position of thrust vectoring during non-afterburning.

FIG. 3 shows relative positioning of the primary flaps and rotatable flaps shown to achieve one direction of thrust vectoring during afterburning. FIG. 4 shows relative positioning of the primary flaps and rotatable flaps shown to achieve one direction of thrust vectoring during non-afterburning.

Figure 5:
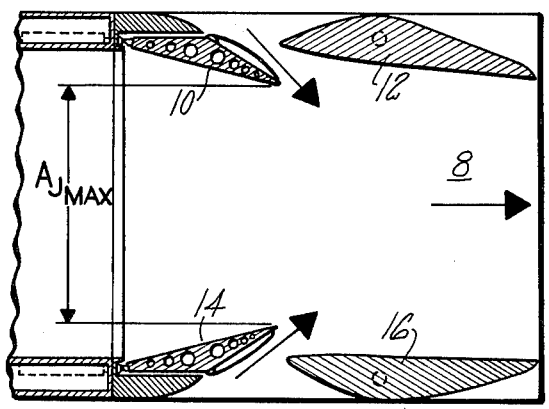
FIG. 5 is a small diagrammatic view showing one position of nozzle ejection during afterburning.
Figure 6:
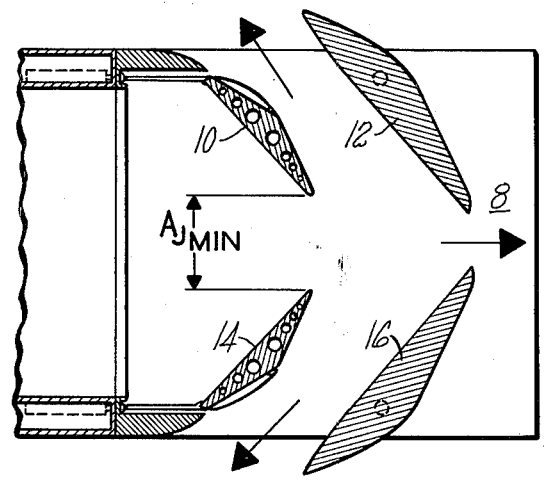
FIG. 6 is a small diagrammatic view showing one position of modulated thrust during non-afterburning.

FIG. 5 shows relative positioning of the primary flaps and rotatable flaps shown to provide an ejector nozzle during afterburning. FIG. 6 shows relative positioning of the primary flaps and rotatable flaps shown to achieve modulated thrust for non-afterburning.

I claim:

1. A two-dimensional exhaust nozzle, said nozzle having a rectangular inlet, fixed sides extending rearwardly from each side of said inlet, a pair of throat area control primary flaps, one throat area control primary flap being located immediately downstream of said rectangular inlet at the top thereof, the other throat area control primary flap being located immediately downstream of said rectangular inlet at the bottom thereof, first means for moving said pair of throat area control flaps between a position where the downstream ends form a minimum throat area and a position where the downstream ends form a maximum throat area, a pair of rotatable flaps, one rotatable flap being located downstream of the top throat area control primary flap, the other rotatable flap being located downstream of the bottom throat area control primary flap, second means for moving said pair of rotatable flaps from a position where they form the divergent section of a convergent-divergent nozzle having the forward end of each rotatable flap positioned adjacent the rearward end of its cooperating throat area control primary flap when the throat area control primary flaps are at their position of maximum throat area to a position where they form an ejector shroud of an ejector nozzle having the forward end of each rotatable flap spaced outwardly from the rearward end of its cooperating throat area control primary flap when the throat area control primary flaps are at their position of minimum throat area.

2. A two-dimensional nozzle as set forth in claim 1 including means for rotating the rear end of one rotatable flap toward the nozzle centerline and means for rotating the rear end of the other rotatable flap away from the nozzle centerline to provide thrust vectoring.

3. A two-dimensional nozzle as set forth in claim 1 including means for rotating the rear ends of said rotatable flaps toward the nozzle centerline to modulate thrust.

4. A two-dimensional nozzle as set forth in claim 1 including means for moving the rear ends of the rotatable flaps toward the nozzle centerline until they touch providing thrust reversal.

5. A two-dimensional nozzle as set forth in claim 1 wherein said rotatable flaps are each pivotally mounted between their forward end and rearward end in relation to the fixed sides.

* * * * *